United States Patent
Kabus et al.

(10) Patent No.: US 8,559,758 B2
(45) Date of Patent: Oct. 15, 2013

(54) APPARATUS FOR DETERMINING A MODIFICATION OF A SIZE OF AN OBJECT

(75) Inventors: Sven Kabus, Hamburg (DE); Rafael Wiemker, Kisdorf (DE)

(73) Assignee: Koninklijke Philips N.V., Eindhoven (NL)

(*) Notice: Subject to any disclaimer, the term of this patent is extended or adjusted under 35 U.S.C. 154(b) by 74 days.

(21) Appl. No.: 13/060,066

(22) PCT Filed: Aug. 24, 2009

(86) PCT No.: PCT/IB2009/053711
§ 371 (c)(1), (2), (4) Date: Feb. 22, 2011

(87) PCT Pub. No.: WO2010/023612
PCT Pub. Date: Mar. 4, 2010

(65) Prior Publication Data
US 2011/0142322 A1    Jun. 16, 2011

(30) Foreign Application Priority Data
Aug. 28, 2008   (EP) ..................................... 08163196

(51) Int. Cl.
G06K 9/00      (2006.01)
G06K 9/32      (2006.01)
A61B 5/05      (2006.01)

(52) U.S. Cl.
USPC ............................ 382/294; 382/131; 600/425

(58) Field of Classification Search
USPC ................... 382/128–131, 294; 600/419, 425
See application file for complete search history.

(56) References Cited

U.S. PATENT DOCUMENTS

| | | | | |
|---|---|---|---|---|
| 6,738,063 | B2* | 5/2004 | Shen et al. | 345/424 |
| 7,206,462 | B1* | 4/2007 | Betke et al. | 382/280 |
| 7,751,607 | B2* | 7/2010 | Reeves et al. | 382/131 |
| 7,764,819 | B2* | 7/2010 | Bahlmann et al. | 382/131 |
| 8,073,230 | B2* | 12/2011 | Fei et al. | 382/132 |
| 2004/0184647 | A1* | 9/2004 | Reeves et al. | 382/131 |
| 2005/0113651 | A1* | 5/2005 | Wood et al. | 600/300 |
| 2005/0207630 | A1* | 9/2005 | Chan et al. | 382/131 |
| 2008/0212852 | A1* | 9/2008 | Sun et al. | 382/128 |
| 2009/0080748 | A1* | 3/2009 | Reeves et al. | 382/131 |

OTHER PUBLICATIONS

Kawata et al, Tracking interval changes of pulmonary nodules using a sequence of three-dimensional thoracic images, Proc. SPIE vol. 3979, p. 86-96, Medical Imaging 2000: Image Processing, Kenneth M. Hanson; Ed.*

(Continued)

*Primary Examiner* — Andrae S Allison

(57) ABSTRACT

The present invention relates to an apparatus for determining a modification of a size of an object. The apparatus comprises a registration unit (13) for registering with respect to each other a first region of interest in a first image data set showing an object at a first time and a second region of interest in a second image data set showing the object at a second time being different from the first time, wherein the registration unit is adapted to generate a scaling value by performing at least a scaling transformation for registering the first region of interest and the second region of interest with respect to each other. The apparatus further comprises a modification value determination unit (14) for determining a modification value, which indicates the modification of the size of the object, depending on the generated scaling value.

9 Claims, 3 Drawing Sheets

(56) References Cited

OTHER PUBLICATIONS

Blaffert et al, Comparison of different follow-up lung registration methods with and without segmentation, Proc. SPIE 5370, Medical Imaging 2004: Image Processing, 1701.*

Ko et al: "Computer-Aided Diagnosis and the Evaluation of Lung Diseases"; J. Thorac. Imaging, 2004, vol. 19, pp. 136-155.

Reeves et al: "On Measuring the Change in Size of Pulmonary Nodules"; IEEE Transactions on Medical Imaging, Apr. 2006, vol. 25, pp. 435-450.

Thirion et al: "Measuring Lesion Growth From 3D Medical Images"; Proceedings of the 1997 IEEE Workshop on Motion of Non-Rigid and Articulated Objects, pp. 112-119.

"Scaling (Geometry)", Jul. 2, 2008, Retrieved From the Internet at http://en/wikipedia.org/w/index.php?title=Scaling_(geometry)&oldid=223021664; *section "Matrix Representation"*; 2 Page Document, Retrieved on Oct. 27, 2009.

Blaffert et al: "Comparison of Different Follow-Up Lung Registration Methods With and Without Segmentation"; Proceedings of SPIE (Medical Imaging 2004), vol. 5370, pp. 1701-1708.

Kawata et al: "Tracking Interval Changes of Pulmonary Nodules Using a Sequence of Three-Dimensional Thoracic Images"; Proceedings of SPIE (Medical Imaging 2000), vol. 3979, Jan. 2000, pp. 86-96.

Brown et al: "Patient-Specific Models for Lung Nodule Detection and Surveillance in CT Images"; IEEE Transactions on Medical Imaging, Dec. 2001, vol. 20, No. 12, pp. 1242-1250.

Ko et al: "Chest CT: Automated Nodule Detection and Assessment of Change Over Time-Preliminary Experience"; Radiology 2001, vol. 218, pp. 267-273.

Wiemker et al: "Computer Aided Lung Nodule Detection on High Resolution CT Data"; Proceedings of SPIE, (Medical Imaging 2002), vol. 4684, 2002, pp. 677-688.

Wiemker et al: "Unsupervised Robust Change Detection on Multispectral Imagery Using Spectral and Spatial Features"; Proceedings From the Third International Airborne Remote Sensing Conference and Exhibition, Copenhagen, Denmark, Jul. 1997, pp. 640-647.

Fetita et al: "3-D Automated Lung Nodule Segmentation in HRCT"; Lecture Notes in Computer Science, 2003, vol. 2878, pp. 626-634.

* cited by examiner

APPARATUS FOR DETERMINING A MODIFICATION OF A SIZE OF AN OBJECT

FIELD OF THE INVENTION

The present invention relates to an apparatus, a method and a computer program for determining a modification of a size of an object.

BACKGROUND OF THE INVENTION

Generally, a lung nodule in a first computed tomography image data set and in a follow-up computed tomography image data set is manually or automatically selected and the selected lung nodule is segmented separately in both computed tomography image data sets. The volume of the segmented lung nodule in the first computed tomography image data set and the volume of the segmented lung nodule in the follow-up computed tomography image data set are determined and compared for determining growth or shrinkage of the lung nodule.

Since the segmentation is performed on each computed tomography image data set separately, yielding a volume number assigned to a lung nodule at each point in time, the segmented volume can be different, even if the same lung nodule having the same size and shape is present in both computed tomography image data sets, for example, because of small variations in the image data set values due to noise, metal or other artifacts, which can be generated during the reconstruction of the computed tomography image data sets. From a mathematical point of view, this can be expressed as an ill-posed problem, since small variations in the input data, i.e. the computed tomography image data set values, may lead to large variations in the output data, i.e. the segmented volumes, causing the accuracy of determining a modification of a size of the lung nodule to be reduced.

SUMMARY OF THE INVENTION

It is an object of the present invention to provide an apparatus, a method and a computer program for determining a modification of a size of an object, wherein the accuracy of determining a modification of a size of an object is improved.

In a first aspect of the present invention an apparatus for determining a modification of a size of an object is presented, wherein the apparatus comprises:
  an image data set providing unit for providing a first image data set showing the object at a first time and for providing a second image data set showing the object at a second time being different from the first time,
  a region of interest providing unit for providing a first region of interest, in which the object shown in the first image data set is located, in the first image data set and for providing a second region of interest, in which the object shown in the second image data set is located, in the second image data set,
  a registration unit for registering the first region of interest and the second region of interest with respect to each other, wherein the registration unit is adapted to generate a scaling value by performing at least a scaling transformation for registering the first region of interest and the second region of interest with respect to each other,
  a modification value determination unit for determining a modification value, which indicates the modification of the size of the object, depending on the generated scaling value.

Since the modification value can be determined without segmenting the object in the first image data set and in the second image data set, the accuracy of the determination of a modification of a size of the object is not decreased by segmentation errors, thereby improving the accuracy of the determination of the modification of the size of the object. Furthermore, the modification value allows quantifying the modification of the size of the object.

The image data set providing unit is preferentially an imaging device, for example, an X-ray computed tomography device, a magnetic resonance imaging device or a nuclear imaging device like a single photon emission computed tomography device or a positron emission tomography device. In other embodiments, the image data set providing unit is, for example, a storing unit, in which the first image data set and the second image data set are stored.

The first image data set and the second image data set are preferentially three-dimensional data sets, in particular, showing a lung of a patient having nodules. Thus, the object, of which a modification of a size has to be determined, is preferentially a lung nodule. In other embodiments, the object can be another object, for example, a lesion or a nodule in another part of the patient or also a technical object. Furthermore, the first image data set and the second image data set can also be a two-dimensional data set or a four-dimensional data set. A dimension of the first image data set and the second image data set can be time.

If the first image data set and the second image data set are three-dimensional or four-dimensional data sets, the region of interest is preferentially a volume of interest.

It is preferred that the registration unit is adapted to generate several scaling values for different dimensions by performing the scaling transformation in different dimensions, wherein different dimensions correspond preferentially to different orthogonal directions. In particular, the registration unit is adapted to generate three scaling values for three dimensions.

If the second region of interest is transformed, the scaling value is preferentially defined as the ratio of the length of the untransformed second region of interest to the length of the transformed second region of interest in the respective dimension, or, if the first region of interest is transformed, the scaling value is preferentially defined as the ratio of the length of the transformed first region of interest to the length of the untransformed first region of interest in the respective dimension.

In another embodiment, the registration unit can be adapted to generate a scaling value by performing at least an isotropic scaling transformation, wherein the same scaling is performed in each dimension. In this embodiment, the modification value determination unit is preferentially adapted to determine the modification value as the scaling value.

In a preferred embodiment, the apparatus further comprises an input unit and preferentially a graphical user interface, which allows a user to select in which dimensions a scaling transformation should be performed or whether an isotropic scaling should be performed.

It is further preferred that the modification value determination unit is adapted to determine a modification value, depending on the several scaling values generated for different dimensions. Preferentially, the registration unit is adapted to generate three scaling values for three dimensions and the modification value determination unit is adapted to determine the modification value based on the three scaling values. It is further preferred that the modification value determination unit is adapted to determine a modification value, depending on a product of the several scaling values. In particular, the modification value is the product of the several scaling values. If only one scaling value has been generated, the modification value is preferentially this generated scaling value. This allows determining a modification value, which can be regarded as a modification factor, wherein a modification value of 1.0 indicates that the size of the object is not modified, a modification value smaller than 1.0 indicates shrinkage and a modification value larger than 1.0 indicates growth.

It is further preferred that the registration unit is adapted to perform an affine transformation, which includes the scaling transformation, for registering the first region of interest and the second region of interest with respect to each other. The affine transformation preferentially includes, in addition to scaling, at least one, in particular all, of the following: translation, rotation and shear, i.e. a transformation is performed with up to 12 degrees of freedom, wherein the one or several scaling values obtained by the affine transformation are used for determining the modification value.

In an embodiment, the region of interest providing unit is adapted to select the object in the first image data set and/or in the second image data set. This region of interest providing unit is preferentially adapted to allow a person to manually select and/or automatically recognize and select an object in the first image data set and/or in the second image data set. The region of interest providing unit is preferentially further adapted to allow manually and/or automatically defining the first region of interest and/or the second region of interest, wherein each of these regions of interest include the object, in the first image data set and/or in the second image data set, respectively.

It is further preferred that the region of interest providing unit comprises:
- a first position providing unit for providing a first position of the object in the first image data set,
- a positioning region providing unit for providing a positioning region including the first position of the object and the object shown in the first image data set,
- an aligning unit for aligning the positioning region with the second image data set, wherein the center of the aligned positioning region defines a second position of the object in the second image data set, wherein the region of interest providing unit is adapted to provide the first region of interest around the first position of the object and to provide the second region of interest around the second position of the object.

The first position providing unit and the positioning region providing unit comprise preferentially a selection unit being adapted to manually or automatically select the first position of the object in the first image data set and to define manually or automatically the positioning region, which includes the first position of the object and the object shown in the first image data set, in the first image data set. The second position of the object, i.e. the position in the second image data set which corresponds to the first position of the object in the first image data set, is then determined by the aligning unit by performing a registration of the positioning region with the second image data set, in particular, with the entire second image data set. This registration leads to a rough alignment of the object positions in the first image data set and in the second image data set. The region of interest providing unit is preferentially adapted to provide the first region of interest around the first position of the object and to provide the second region of interest around the second position of the object such that the first region of interest and the second region of interest are smaller than the positioning region. It is further preferred that, considering the shape of the first and second regions of interest, the size of the first region of interest and the second region of interest is chosen such that they substantially include the object only. For example, if the first and second regions of interests are rectangular, the side lengths of the rectangular regions of interest are chosen such that the object is just included in the regions of interests. If the object is a lung nodule, the positioning region is preferentially cuboid having a side length of 10 cm, whereas the regions of interests are cuboids having a smaller side length. The aligning unit is preferentially adapted to perform at least one of a translational operation and a rotational operation only.

This rough alignment of the object positions and of the corresponding first and second regions of interest yields two well defined regions of interests, in which the object is generally substantially centered. This improves the quality of the registration performed by the registration unit, because the first region of interest and the second region of interest have a large amount of common information.

It is further preferred that the aligning unit is adapted to determine a geometrical position of the first position of the object with respect to a coordinate system, which is common to the first image data set and the second image data set, to determine an intermediate second position of the object by determining the geometrical position in the second image data set by using the coordinate system, and to start, i.e. initialize, aligning the positioning region with the second image data set by positioning the positioning region in the second image data set such that the center of the positioning region is the intermediate second position of the object. This gives the aligning unit an initial position for the aligning of the positioning region with the second image data set, which reduces the computational costs for the aligning procedure.

A common coordinate system is preferentially a coordinate system, which is defined with respect to a structure, wherein the geometrical relation between the structure and each image value position of the first image data set and the geometrical relation between the same structure and each image value position of the second image data set is known. This structure is, for example, a feature of the computed tomography apparatus or a feature, which can be identified in both image data sets, like the whole lung or vessels.

It is further preferred that the common coordinate system is the known scanner coordinate system, if both the first image data set and the second image data set are acquired by the same imaging apparatus. If the patient positioning is equal or very similar for the first image data set and for the second image data set, the patient has the same position with respect to the scanner coordinate system in both image data sets, and corresponding positions in the first image data set and in the second image data set can be determined by determining the same geometrical position in the first image data set and in the second image data set with respect to the common coordinate system.

It is further preferred that
  the registration unit is adapted to perform a first registration for registering the first region of interest onto the second region of interest, wherein the registration unit is adapted to generate a first scaling value by performing at least a scaling transformation for registering the first region of interest onto the second region of interest,
  the modification value determination unit is adapted to determine a first modification value, which indicates the modification of the size of the object, depending on the generated first scaling value,
  the registration unit is adapted to perform a second registration for registering the second region of interest onto the first region of interest, wherein the registration unit is adapted to generate a second scaling value by performing at least a scaling transformation for registering the second region of interest onto the first region of interest, the modification value determination unit is adapted to determine a second modification value, which indicates the modification of the size of the object, depending on the generated second scaling value. If the registration unit is adapted to generate several scaling values, first scaling values are generated by performing at least a scaling transformation for registering the first region of interest onto the second region of interest and a first modification value is determined depending on these generated first scaling values, and second scaling values are generated by performing at least a scaling transformation for registering the second region of interest onto the first region of interest and a second modification value is determined depending on the generated second scaling values. This allows monitoring the accuracy of the determination of a modification of a size of the object by checking whether the first modification value and the second modification value are inverse to each other.

It is further preferred that the apparatus comprises:

a similarity determination unit for determining whether one of the first modification value and the second modification value and the inverse of the other of the first modification value and the second modification value are similar with respect to a similarity measure, an output unit for outputting a signal if the similarity determination unit has determined that one of the first modification value and the second modification value and the inverse of the other of the first modification value and the second modification value are not similar with respect to the similarity measure.

The output unit is, for example, a display, which displays the difference between one of the first modification value and the second modification value and the inverse of the other of the first modification value and the second modification value. Instead of or in addition to a display, the output unit can also be adapted to output an acoustical signal if the similarity determination unit has determined that one of the first modification value and the second modification value and the inverse of the other of the first modification value and the second modification value are not similar with respect to the similarity measure.

The similarity measure is preferentially predetermined. The similarity determination unit is preferentially adapted to determine that one of the first modification value and the second modification value and the inverse of the other of the first modification value and the second modification value are not similar if their absolute difference is larger than a predefined threshold. Preferentially, the threshold is equal to or smaller than 20%, more preferably equal to or smaller than 15%, even more preferably equal to or smaller than 10% and most preferably equal to or smaller than 5%, with respect to a modification value, which indicates no modification of the size of the object.

In a further aspect of the present invention a method of determining a modification of a size of an object is presented, wherein the method comprises the following steps:

providing a first image data set showing the object at a first time and providing a second image data set showing the object at a second time being different from the first time, providing a first region of interest, in which the object shown in the first image data set is located, in the first image data set and providing a second region of interest, in which the object shown in the second image data set is located, in the second image data set, registering the first region of interest and the second region of interest with respect to each other, wherein a scaling value is generated by performing at least a scaling transformation for registering the first region of interest and the second region of interest with respect to each other, determining a modification value, which indicates the modification of the size of the object, depending on the generated scaling value.

In a further aspect of the present invention, a computer program for determining a modification of a size of an object is presented, wherein the computer program comprises program code means for causing an apparatus as defined in claim 1 to carry out the steps of the method as defined in claim 10, when the computer program is run on a computer controlling the apparatus.

It shall be understood that the apparatus of claim 1, the method of claim 10 and the computer program of claim 11 have similar and/or identical preferred embodiments as defined in the dependent claims.

It shall be understood that a preferred embodiment of the invention can also be any combination of the dependent claims with respect to the independent claim.

BRIEF DESCRIPTION OF THE DRAWINGS

These and other aspects of the invention will be apparent from and elucidated with reference to the embodiments described hereinafter. In the following drawings.

DETAILED DESCRIPTION OF EMBODIMENTS

Figure 1:
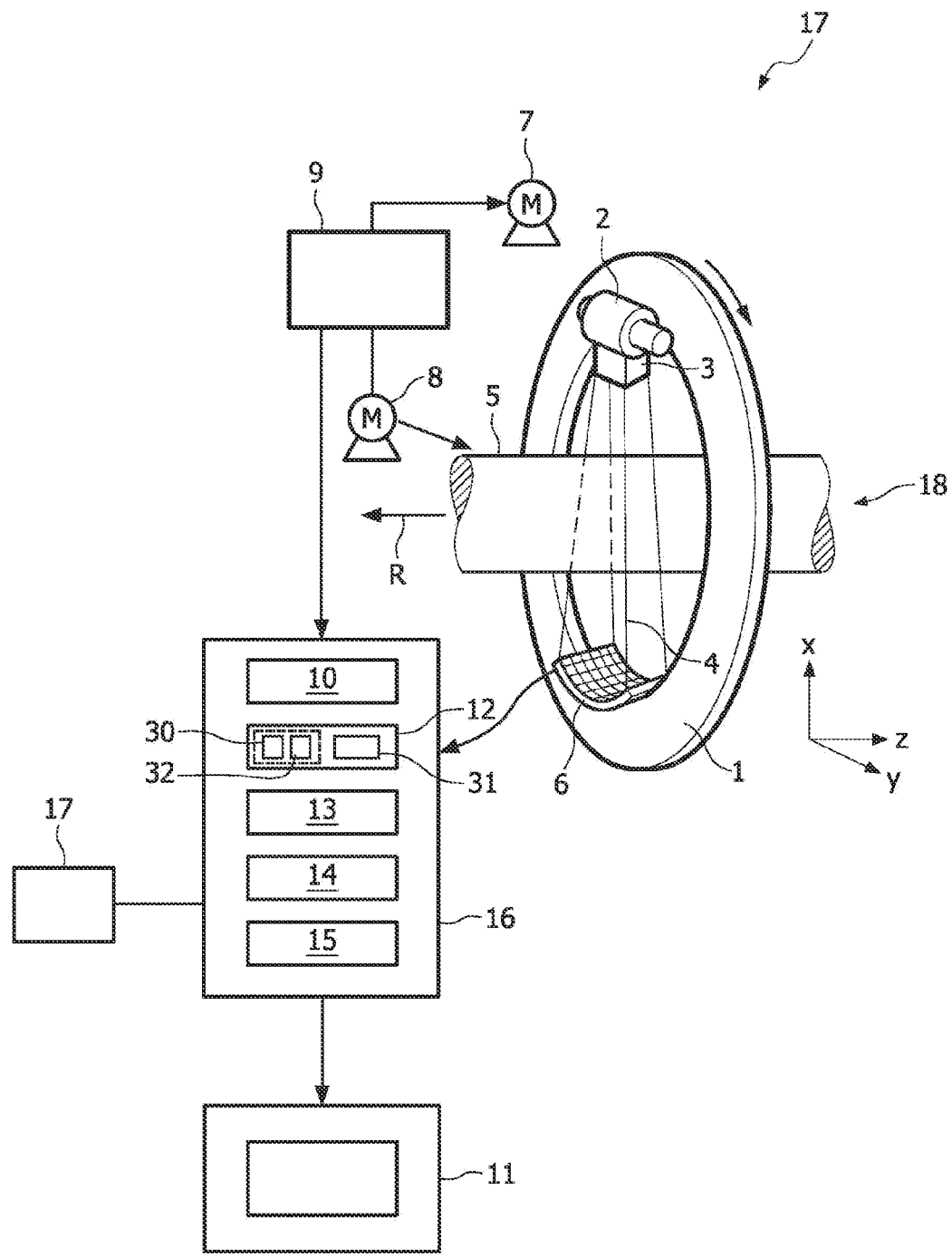
FIG. 1 shows schematically and exemplarily an embodiment of an apparatus for determining a modification of a size of an object.

FIG. 1 shows schematically and exemplarily an apparatus 17 for determining a modification of a size of an object. In this embodiment, the apparatus for determining a modification of a size of an object is a computed tomography system. The computed tomography system includes a gantry 1, which is capable of rotation about a rotational axis R, which extends parallel to the z-direction. A radiation source 2, which is, in this embodiment, an X-ray tube, is mounted on the gantry 1. The radiation source 2 is provided with a collimator 3, which forms, in this embodiment, a conical radiation beam 4 from the radiation generated by the radiation source 2. The radiation traverses an examination zone 5, which is, in this embodiment, cylindrical and which contains, in this embodiment, a patient or a technical element. After having traversed the examination zone 5, the radiation beam 4 is incident on a detection device 6, which comprises a two-dimensional detection surface. The detection device 6 is mounted on the gantry 1.

The computed tomography system comprises two motors 7, 8. The gantry is driven at a preferably constant but adjustable angular speed by the motor 7. The motor 8 is provided for displacing, in this embodiment, the patient, who is arranged on a patient table in the examination zone 5, parallel to the direction of the rotational axis R or the z axis. These motors 7, 8 are controlled by a control unit 9, for instance, such that the radiation source 2 and the examination zone 5 move relative to each other along a helical trajectory. However, it is also possible that the examination zone 5 containing, in this embodiment, the patient is not moved, but that only the radiation source 2 is rotated, i.e. that the radiation source moves along a circular trajectory relative to the examination zone 5, in particular, in this embodiment, relative to the patient. Furthermore, in another embodiment, the collimator 3 can be adapted for forming another beam shape, in particular, a fan beam, and the detection device 6 can comprise a detection surface, which is shaped so as to correspond to the other beam shape, in particular, the fan beam.

During a relative movement of the radiation source 2 and the examination zone 5, the detection device 6 generates measured data, depending on the radiation incident on the detection surface of the detection device 6. The measured data, which are, in this embodiment, projection data, are provided to an image generation device 10 for generating an image data set from the measured data, i.e. from the projection data. In this embodiment, the image generation device 10 is adapted to reconstruct an image data set from the measured data by using a backprojection algorithm. However, in other embodiments, other algorithms can be used for reconstructing an image data set from the measured data, for example, a radon inversion.

The radiation source 2, the elements for moving the radiation source 2 relative to the examination zone 5, in particular, the motors 7, 8 and the gantry 1, the detection device 6 and the image generation device 10 form an image data set providing unit 18 for providing a first image data set showing an object at a first time and for providing a second image data set showing the object at a second time being different from the first time. In another embodiment, the image data set providing unit can be a storing unit, in which the first image data set and the second image data set are stored already. In this case, the apparatus for determining a modification of a size of an object does not need the radiation source, the detection device, the elements for moving the radiation source relative to the examination zone and the image generation device, or another system for acquiring measured data and for generating an image data set from the measured data. The apparatus for determining a modification of a size of an object is, in an embodiment, a workstation comprising at least the storing unit for storing the first and second image data set, a region of interest providing unit, a registration unit and a modification value determination unit, which will be described further below.

A processing unit 16, which also comprises the image generation device 10, comprises the region of interest providing unit 12 for providing the first region of interest, in which the object is located, in the first image data set and for providing a second region of interest, in which the object is located, in the second image data set. In this embodiment, the region of interest providing unit 12 comprises a first position providing unit 30 for providing a first position of the object in the first image data set, a positioning region providing unit 32 for providing a positioning region including the first position of the object and the object, and an aligning unit 31 for aligning the positioning region with the second image data set, wherein the center of the aligned positioning region defines a second position of the object in the second image data set and wherein the region of interest providing unit is adapted to provide the first region of interest around the first position of the object and to provide the second region of interest around the second position of the object. The first position providing unit 30 and the positioning region providing unit 32 comprise a selection unit being adapted to select the object position in the first image data set, i.e. the first position of the object, and to define the positioning region in the first image data set such that it includes the first position of the object and the selected object. The first position providing unit 30 and the positioning region providing unit 32 preferentially comprise or consist of the same selection unit, which is adapted to provide the first position of the object and the positioning region, and are indicated in FIG. 1 by a dashed box. For example, the selection unit comprises a graphical user interface and an input unit like a keyboard or a mouse for selecting an object in the first image data set, which is shown on a display 11. The selection unit can also be adapted to automatically detect and select the first position of the object in the first image data set, for example, a lung nodule in a first image data set showing the lung of a patient. For this automatic detection and selection of the first position of the object, in particular, a lung nodule, preferentially an algorithm is used, which is defined in M. S. Brown, M. F. McNitt-Gray, J. G. Goldin, R. D. Suh, J. W. Sayre, and D. R. Aberle, "Patient-specific models for lung nodule detection and surveillance in CT images," IEEE Trans. Med. Imag., vol. 20, no. 12, pp. 1242-1250, December 2001; J. P. Ko and M. Betke, "Chest CT: automated nodule detection and assessment of change over time—preliminary experience," Radiology, vol. 218, no. 1, pp. 267-273, 2001; R. Wiemker, P. Rogalla, A. Zwartkruis, and T. Blaffert, "Computer aided lung nodule detection on high resolution CT data," Proc. SPIE, vol. 4684, pp. 677-688, 2002; C. I. Fetita, F. Prêteux, C. Beigelman-Aubry, and P. Grenier, "3-D automated lung nodule segmentation in HRCT," in Lecture Notes in Computer Science. Berlin, Germany: Springer-Verlag, 2003, vol. 2878, Medical Image Computing and Computer-Assisted Intervention, pp. 626-634; or R. Wiemker, A. Speck, D. Kulbach, H. Spitzer and J. Beinlein (1997): "Unsupervised robust change detection on multispectral imagery using spectral and spatial features", in Proceedings from the Third International Airborne Remote Sensing Conference and Exhibition, Copenhagen, Denmark, vol. I, pp. 640-647, which are herewith incorporated by reference.

The selection unit is preferentially further adapted to allow a user to manually define the positioning region and/or the first region of interest or automatically define the positioning region and/or first region of interest, which includes the selected object. The shape of the positioning region and/or the region of interest, which is preferentially a volume of interest, may be arbitrarily chosen, but can be rectangular. The size of the positioning region and/or the region of interest can be prescribed by a user, for example, by clicking on the object and by dragging until the desired radius is reached, or it may be implemented as a constant according to a typical size, in particular volume, of the selected object, in particular, of a lung nodule.

In a preferred embodiment, the positioning region is larger than the first region of interest. Furthermore, the region of interest providing unit is adapted such that the first region of interest, in particular, the size and, in particular, the shape, is selectable by a user, whereas the size and shape of the positioning region are predefined such that the kind of object, which should be included within the positioning region, is surely within the positioning region. For example, in the case of the object being a lung nodule, the position region is preferentially a cuboid, whose center is the first position of the object and whose side length is 10 cm.

The first position providing unit 30 provides a first position of the object in the first image data set and the positioning region providing unit 32 provides a positioning region including the first position of the object and the object. Then, the aligning unit 31 determines a geometrical position of the first position of the object with respect to a coordinate system, which is common to the first image data set and the second image data set, to determine an intermediate second position of the object by determining the geometrical position in the second image data set by using the coordinate system. Thus, the aligning unit determines an intermediate second position of the object in the second image data set, which should correspond to the first position of the object in the first image data set, by finding the geometrical position, which has been determined in the first image data set, in the second image data set with respect to a common coordinate system. This common coordinate system can be defined by the geometry of the computed tomography apparatus, which has been used for generating the first and second image data sets. Furthermore, structures like the whole lung or vessels shown in the first and in the second image data set can be used for determining an intermediate second position of the object, which corresponds to the first position of the object. This determination of the intermediate second position of the object by using a common coordinate system and/or structures shown in both image data sets is generally a rough determination only, in particular, if the object moves between the generation of the first image data set and the second image data set, in particular, if the object is a lung nodule of a patient.

The aligning unit 31 starts aligning the positioning region with the second image data set by positioning the positioning region in the second image data set such that the center of the positioning region is the intermediate second position of the object. The positioning region is now transformed, in particular, translated and/or rotated, in the second image data set such that a similarity measure, which describes the similarity between the positioning region in the first image data set and the transformed positioning region in the second image data set, is optimized. The center of the transformed positioning region in the second image data set, which corresponds to an optimized similarity measure, is the second position of the object, which will be used for defining the second region of interest. The similarity measure is preferentially the sum of squared differences. In other embodiments, other similarity measures such as correlation-type, image gradient-based, or mutual information-like measures can be used.

Then, the region of interest providing unit 12 provides the first region of interest around the first position of the object and provides the second region of interest around the second position of the object. This is preferentially performed by using a first region of interest, which has been selected by a user using the selection unit, and by centering a second region of interest having the geometrical dimensions of the first region of interest around the determined second position of the object in the second image data set.

In another embodiment, the region of interest providing unit is a storing unit, in which the shape and the location of the first region of interest and/or of the second region of interest are stored already.

The processing unit 16 further comprises the registration unit 13 for registering the first region of interest and the second region of interest with respect to each other, wherein the registration unit 13 is adapted to generate a scaling value, which can also be regarded as a scaling factor, by performing at least a scaling transformation for registering the first region of interest and the second region of interest with respect to each other. In this embodiment, the registration unit is adapted to perform an affine transformation, which includes the scaling transformation, for registering the first region of interest and the second region of interest with respect to each other. The affine transformation includes, in this embodiment, scaling, translation, rotation and shear, i.e. the transformation is performed with 12 degrees of freedom.

The registration scheme within the registration unit 13 takes the following data as input: the first region of interest, the second region of interest, and a transformation vector, which describes a transformation of the first region of interest or of the second region of interest. The transformation vector is initialized with zero values for any translation, rotation or shear and with values of one for any scaling, i.e. initially the scaling values are one. The registration of the first region of interest with the second region of interest is performed with an optimization scheme, wherein the transformation is applied to the second region of interest, wherein the transformation vector is modified such that a similarity measure applied to the first region of interest and the transformed second region of interest is optimized. In other embodiments, the transformation can be applied to the first region of interest for transforming the first region of interest, wherein the transformation vector is modified such that a similarity measure applied to the transformed first region of interest and the second region of interest is optimized. The similarity measure is preferentially the sum of squared differences. In other embodiments, other similarity measures such as correlation-type, image gradient-based, or mutual information-like measures can be used as similarity measure. The result of the registration performed by the registration unit 13 is the optimized transformation vector with at least one optimized scaling value.

The processing unit 16 further comprises the modification value determination unit 14 for determining a modification value, which indicates the modification of the size of the object, depending on the generated scaling value. In this embodiment, the registration unit 13 is adapted to generate three scaling values and the modification value determination unit is adapted to multiply the three scaling values, which correspond to the three dimensions, for determining the modification value.

The apparatus for determining a modification of a size of an object further comprises an input unit 17 like a keyboard or a mouse, which allows a user to select in which dimension a scaling value should be calculated or if an isotropic scaling value should be determined. The apparatus preferentially comprises a graphical user interface, which is shown on a display 11 and which comprises a menu, in which a user can make his selection by clicking on corresponding marks in the menu. The modification value determination unit 14 is preferentially adapted to determine the modification value, based on the selection of the scaling values made by the user.

The determined modification value and preferentially also the one or several generated scaling values are shown on the display 11.

In an embodiment, the registration unit 13 is adapted to perform a first registration for registering the first region of interest onto the second region of interest, wherein the registration unit 13 is adapted to generate a first scaling value by performing at least a scaling transformation for registering the first region of interest onto the second region of interest, and the modification value determination unit is adapted to determine a first modification value, which indicates the modification of the size of the object, depending on the generated first scaling value. Furthermore, the registration unit 13 is preferentially adapted to perform a second registration for registering the second region of interest onto the first region of interest, wherein the registration unit 13 is adapted to generate a second scaling value by performing at least a scaling transformation for registering the second region of interest onto the first region of interest, and the modification value determination unit is adapted to determine a second modification value, which indicates the modification of the size of the object, depending on the generated second scaling value.

The first modification value and the second modification value should be consistent, i.e. the first modification value should be similar to the inverse of the second modification value or vice versa.

A similarity determination unit 15 determines whether the above-mentioned similarity is given, i.e. whether one of the first modification value and the second modification value and the inverse of the other of the first modification value and the second modification value are similar with respect to a similarity measure. The similarity determination unit 15 is preferentially adapted to determine that one of the first modification value and the second modification value and the inverse of the other of the first modification value and the second modification value are not similar if their absolute difference is larger than a predefined threshold. Preferentially, the threshold is equal to or smaller than 20%, more preferably equal to or smaller than 15%, even more preferably equal to or smaller than 10% and most preferably equal to or smaller than 5%, with respect to a modification value, which indicates no modification of the size of the object, i.e. no growth and no shrinkage.

If the similarity determination unit 15 has determined that one of the first modification value and the second modification value and the inverse of the other of the first modification value and the second modification value are not similar with respect to the similarity measure, this will be indicated on the display 11. For example, a red indication can be displayed if the first modification value and the second modification value are not consistent, and a green indication can be displayed if they are consistent.

In another embodiment, instead of or in addition to the display 11, another output unit, for example, an acoustical output unit, can be used for outputting a signal if the similarity determination unit 15 has determined that the first modification value and the second modification value are not consistent, i.e. that at least one of the first modification value and the second modification value and the inverse of the other of the first modification value and the second modification value are not similar with respect to the similarity measure.

Figure 2:
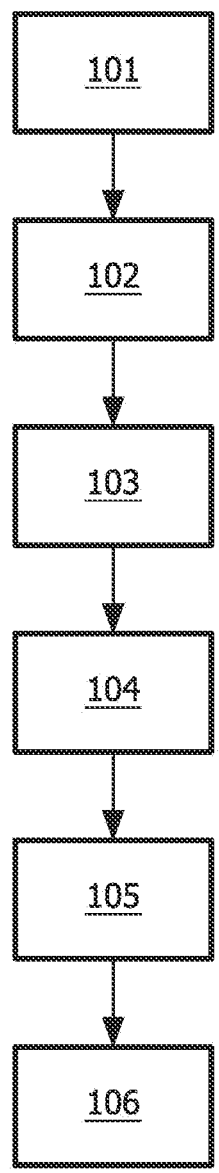
FIG. 2 shows exemplarily a flow chart illustrating an embodiment of a method for determining a modification of a size of an object.

In the following, a method of determining a modification of a size of an object will be described with reference to a flow chart shown in FIG. 2.

In step 101, a first image data set and a second image data set are provided by the image data set providing unit 18. In this embodiment, a first computed tomography thorax scan has been performed for generating a first image data set showing the lung of a patient and later on a follow-up computed tomography thorax scan has been performed for generating a second image data set showing the lung of the patient at a later time.

In step 102, the region of interest providing unit 12 provides a first region of interest 22, in which an object 23 is located, in the first image data set 20 and provides a second region of interest 25, in which the object 24 with a modified size is located, in the second image data set 21. The region of interest providing unit 12 comprises the first position providing unit 30, which provides a first position 35 of the object in the first image data set 20, the positioning region providing unit 32, which provides a positioning region 36 including the first position 35 of the object and the object 23, and the aligning unit 31. The aligning unit 31 determines a geometrical position of the first position 35 of the object with respect to the coordinate system, which is common to the first image data set 20 and the second image data set 21, to determine an intermediate second position of the object by determining the geometrical position in the second image data set 21 by using the coordinate system. Then, the aligning unit 31 starts aligning the positioning region 36 with the second image data set 21 by positioning the positioning region 36 in the second image data set 21 such that the center of the positioning region is the intermediate second position of the object. After this alignment is completed, the center of the aligned positioning region defines a second position 37 of the object in the second image data set 21. The region of interest providing unit 12 then provides the first region of interest 22 around the first position 35 of the object and the second region of interest 25 around the second position 37 of the object.

Figure 3:
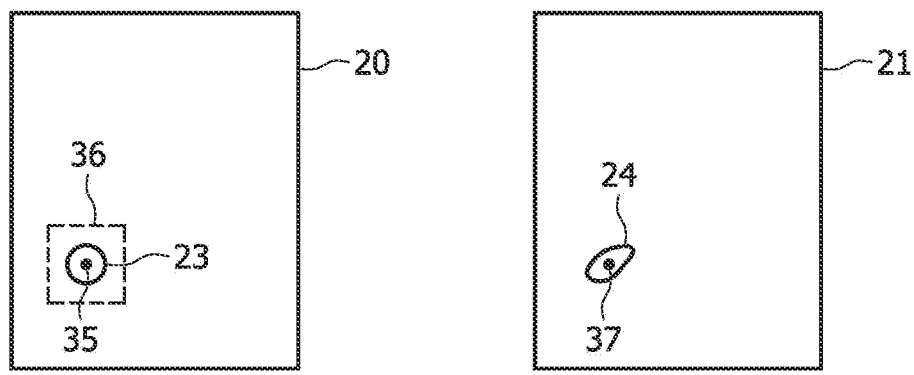
FIG. 3 shows schematically and exemplarily a first image data set, a second image data set, an object in these image data sets and a positioning region.
Figure 4:
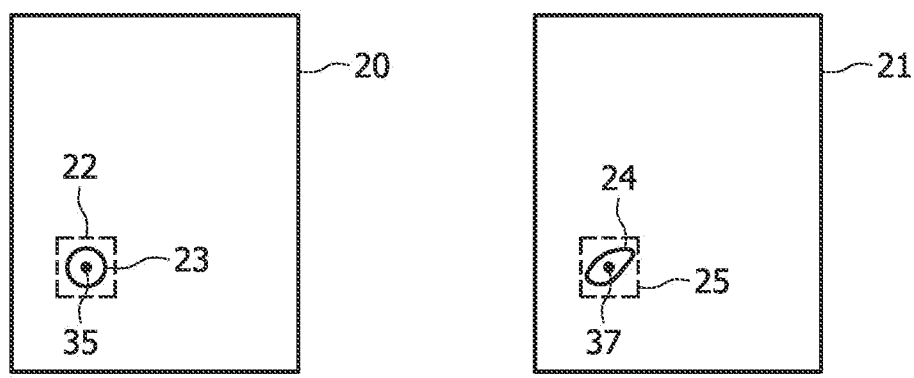
FIG. 4 shows schematically and exemplarily the first image data set, the second image data set, the object in these image data sets, a first region of interest and a second region of interest.

The first position providing unit 30 comprises preferentially a selection unit being adapted to select the first position 35 of the object, which is preferentially a lung nodule, in the first image data set 20. The selection unit can also be adapted to define the first region of interest 22 in the first image data set 20. The selection unit can comprise, for example, a graphical user interface for allowing a user to select the first position 35 of the object in the first image data set 20. Then, manually by the user or automatically, the first region of interest 22 is defined, which includes the selected first position 35 of the object and preferentially the object 23. The shape of the first region of interest 22, which is preferentially a volume of interest, may be arbitrarily chosen, but can be rectangular. The size of the first region of interest 22 can be prescribed by a user, for example, by clicking on the object 23 and dragging until the desired radius is reached, or it may be implemented as a constant according to a typical size, in particular volume, of the selected object 23, in particular, of a lung nodule. The positioning region is preferentially larger than the first region of interest and is preferentially automatically chosen centered around the first position of the object, for example, by using a predefined size of the positioning region, or is also selected by the user using the selection unit. The first image data set 20 with the object 23 and the first position 35 of the object included in the positioning region 36 and the second image data set 21 with the object 24 and the second position 37 of the object at another point in time are exemplarily and schematically shown in FIG. 3. FIG. 4 shows schematically and exemplarily the first image data set 20 with the object 23 included in the first region of interest 22 and the second image data set 21 with the object 24 in the second region of interest 25.

In step 103, the registration unit 13 registers the first region of interest and the second region of interest with respect to each other, wherein the registration unit is adapted to generate a scaling value by performing at least a scaling transformation for registering the first region of interest and the second region of interest with respect to each other. In this embodiment, the registration unit generates three scaling values for three dimensions, which preferentially correspond to three orthogonal spatial directions. In another embodiment, a user can select for which dimension a scaling value should be determined or whether an isotropic scaling value should be determined, and the registration unit 13 is adapted to generate one or several scaling values in accordance with this selection.

In step 104, the modification value determination unit 14 determines a modification value, which indicates the modification of the size of the object, depending on the generated scaling value. In this embodiment, the registration unit 13 generates three scaling values corresponding to three dimensions, and the modification value determination unit 14 multiplies these three scaling values for determining the modification value.

The determined modification value and preferentially also the generated scaling values are displayed on the display 11.

In step 105, the registration unit 13 and the modification value determination unit 14 determine a second modification value. For the determination of the second modification value, the registration is performed in the opposite direction with respect to the registration performed in step 103. If, for example, in step 103 the first region of interest has been registered onto the second region of interest, in step 105 the second region of interest is registered onto the first region of interest. Step 105 yields a second modification value, which should be inverse to the first modification value determined in step 104.

Also the second modification value is preferentially displayed on the display 11.

In step 106, the similarity determination unit 15 determines whether the first modification value and the inverse second modification value are similar with respect to the above-mentioned similarity measure, wherein the output unit 11, in this embodiment the display, outputs a signal if the similarity determination unit 15 has determined that the first modification value and the inverse second modification value are not similar with respect to the similarity measure.

The apparatus, method and computer program for determining a modification of a size of an object allow a growth assessment for pulmonary nodules, which is an important parameter to distinguish malignant nodules from benign ones. The assessment of growth is usually done by comparing follow-up computed tomography examinations of a patient typically with an interval of three to six months. For this assessment, the nodules are segmented a) in a first image data set and b) in a follow-up image data set, and the volume of the segmented nodules is determined. As mentioned above, the segmentation is generally erroneous, thereby diminishing the accuracy of determining growth or shrinkage of a nodule. In contrast, the above-described apparatus and method of the present invention allow estimating nodule growth or shrinkage without segmentation. The segmentation step is replaced by a specialized affine registration of local regions from the two examinations.

The apparatus for determining a modification of a size of an object can be integrated into computed tomography scanner consoles, imaging workstations and PACS workstations. In particular, the apparatus and the method can be used as a part of a computer aided diagnosis (CAD) system for determining malignant and benign tumors such as pulmonary nodules.

The scaling values and the modification value are preferentially determined such that a modification value of x, with $x \geq 1$, is equal to an object growth by $100(x-1)$ % and such that a modification value of y, with $y \leq 1$, is equal to an object shrinkage to $100y$ %.

The apparatus for determining a modification of a size of an object can be adapted to show, in addition to the modification value and preferentially the at least one scaling value, the object in the first region of interest, the object in the second region of interest and a subtraction image, in which the registered first and second region of interests are subtracted from each other, on the display 11.

Although, in the above described embodiments, the image data set providing unit is preferentially a unit for acquiring computed tomography projection data and for generating a computed tomography image data set from these projection data, in particular for generating a computed tomography thorax image data set, in other embodiments, the image data set providing unit can be any unit which provides a first image data set and a second image data set showing the same object. The image data set providing unit can be just a storing unit, in which the respective image data sets are stored, a receiving unit, which receives the first image data set and the second image data set from another unit, for example, via an internet connection, or the image data set providing unit can be another imaging system like a magnetic resonance imaging system, a nuclear imaging system, an optical imaging system, an ultrasound imaging system et cetera.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations and determinations, like the alignment, registration, modification value determination and similarity determination procedures, performed by one or several units or devices can be performed by any other number of units or devices. For example, the alignment, registration, modification value determination and similarity determination procedures can be performed by a single unit or by any other number of different units. The calculations and determinations and/or the control of the apparatus for determining a modification of a size of an object in accordance with the method of determining a modification of a size of an object can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the internet or other wired or wireless telecommunication systems.

Any reference signs in the claims should not be construed as limiting the scope.

The invention claimed is:

1. An apparatus for determining a modification of a size of an object, the apparatus comprising:
   an image data set providing unit for providing a first image data set showing the object at a first time and for providing a second image data set showing the object at a second time being different from the first time,
   a region of interest providing unit for providing a first region of interest, in which the object shown in the first image data set is located, in the first image data set and for providing a second region of interest, in which the object shown in the second image data set is located, in the second image data set,
   a registration unit for registering the first region of interest and the second region of interest with respect to each other, wherein the registration unit is adapted to generate a scaling value by performing at least a scaling transformation for registering the first region of interest and the second region of interest with respect to each other, wherein the registering includes generating a first scaling value by performing the scaling transformation for registering the first region of interest onto the second region of interest and generating a second scaling value by performing the scaling transformation for registering the second region of interest onto the first region of interest, a modification value determination unit for determining a modification value, which indicates the modification of the size of the object, depending on the generated scaling value, wherein the determining includes determining a first modification value, which indicates the modification of the size of the object, depending on the generated first scaling value and determining a second modification value, which indicates the modification of the size of the object, depending on the generated second scaling value, a similarity determination unit for determining whether one of the first modification value and the second modification value and the inverse of the other of the first modification value and the second modification value are similar with respect to a similarity measure, and an output unit for outputting a signal if the similarity determination unit has determined that one of the first modification value and the second modification value and the inverse of the other of the first modification value and the second modification value are not similar with respect to the similarity measure.

2. The apparatus as claimed in claim 1, wherein the registration unit is adapted to generate several scaling values for different dimensions by performing the scaling transformation in different dimensions.

3. The apparatus as claimed in claim 2, wherein the modification value determination unit is adapted to determine a modification value depending on the several scaling values generated for different dimensions.

4. The apparatus as claimed in claim 3, wherein the modification value determination unit is adapted to determine a modification value depending on a product of the several scaling values.

5. The apparatus as claimed in claim 1, wherein the registration unit is adapted to perform an affine transformation, which includes the scaling transformation, for registering the first region of interest and the second region of interest with respect to each other.

6. The apparatus as claimed in claim 1, wherein the region of interest providing unit comprises:
    a first position providing unit for providing a first position of the object in the first image data set,
    a positioning region providing unit for providing a positioning region including the first position of the object and the object shown in the first image data set,
    an aligning unit for aligning the positioning region with the second image data set, wherein a center of the aligned positioning region defines a second position of the object in the second image data set,
    wherein the region of interest providing unit is adapted to provide the first region of interest around the first position of the object and to provide the second region of interest around the second position of the object.

7. The apparatus as claimed in claim 6, wherein the aligning unit is adapted to determine a geometrical position of the first position of the object with respect to a coordinate system, which is common to the first image data set and the second image data set, to determine an intermediate second position of the object by determining the geometrical position in the second image data set by using the coordinate system, and to start aligning the positioning region with the second image data set by positioning the positioning region in the second image data set such that the center of the positioning region is the intermediate second position of the object.

8. A method of determining a modification of a size of an object, the method comprising the following steps:
    providing a first image data set showing the object at a first time and providing a second image data set showing the object at a second time being different from the first time,
    providing a first region of interest, in which the object shown in the first image data set is located, in the first image data set and providing a second region of interest, in which the object shown in the second image data set is located, in the second image data set,
    registering the first region of interest and the second region of interest with respect to each other, wherein a scaling value is generated by performing at least a scaling transformation for registering the first region of interest and the second region of interest with respect to each other, wherein the registering includes generating a first scaling value by performing the scaling transformation for registering the first region of interest onto the second region of interest and generating a second scaling value by performing the scaling transformation for registering the second region of interest onto the first region of interest,
    determining a modification value, which indicates the modification of the size of the object, depending on the generated scaling value, wherein the determining includes determining a first modification value, which indicates the modification of the size of the object, depending on the generated first scaling value and determining a second modification value, which indicates the modification of the size of the object, depending on the generated second scaling value,
    determining whether one of the first modification value and the second modification value and the inverse of the other of the first modification value and the second modification value are similar with respect to a similarity measure, and
    outputting a signal if the similarity determination unit has determined that one of the first modification value and the second modification value and the inverse of the other of the first modification value and the second modification value are not similar with respect to the similarity measure.

9. A computer program embodied on a non-transitory computer-readable medium for determining a modification of a size of an object, the computer program causing an apparatus to carry out a method, the method comprising the steps of:
    providing a first image data set showing the object at a first time and providing a second image data set showing the object at a second time being different from the first time,
    providing a first region of interest, in which the object shown in the first image data set is located, in the first image data set and providing a second region of interest, in which the object shown in the second image data set is located, in the second image data set,
    registering the first region of interest and the second region of interest with respect to each other, wherein a scaling value is generated by performing at least a scaling transformation for registering the first region of interest and the second region of interest with respect to each other, wherein the registering includes generating a first scaling value by performing the scaling transformation for registering the first region of interest onto the second region of interest and generating a second scaling value by performing the scaling transformation for registering the second region of interest onto the first region of interest, determining a modification value, which indicates the modification of the size of the object, depending on the generated scaling value, wherein the determining includes determining a first modification value, which indicates the modification of the size of the object, depending on the generated first scaling value and determining a second modification value, which indicates the modification of the size of the object, depending on the generated second scaling value, determining whether one of the first modification value and the second modification value and the inverse of the other of the first modification value and the second modification value are similar with respect to a similarity measure, and outputting a signal if the similarity determination unit has determined that one of the first modification value and the second modification value and the inverse of the other of the first modification value and the second modification value are not similar with respect to the similarity measure.

* * * * *